(12) United States Patent
Karr

(10) Patent No.: US 7,437,136 B2
(45) Date of Patent: Oct. 14, 2008

(54) SYSTEM AND METHOD FOR REDUCING NOISE IN A RECORDING RECEIVER

(75) Inventor: Lawrence J. Karr, Santa Monica, CA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 11/215,688

(22) Filed: Aug. 29, 2005

(65) Prior Publication Data

US 2006/0003724 A1 Jan. 5, 2006

Related U.S. Application Data

(63) Continuation of application No. 10/044,301, filed on Oct. 26, 2001, now Pat. No. 6,950,642.

(51) Int. Cl.
*H04B 1/16* (2006.01)
(52) U.S. Cl. ............... 455/296; 455/574; 455/343.4
(58) Field of Classification Search ............... 455/67.11, 455/67.13, 556.1, 343.1–343.5, 127.1, 296, 455/334, 574
See application file for complete search history.

(56) References Cited

U.S. PATENT DOCUMENTS

| | | | | |
|---|---|---|---|---|
| 6,028,887 A | * | 2/2000 | Harrison et al. | 375/147 |
| 6,114,989 A | * | 9/2000 | Fontes et al. | 342/357.06 |
| 6,158,884 A | * | 12/2000 | Lebby et al. | 368/282 |
| 6,330,334 B1 | * | 12/2001 | Ryan | 380/237 |
| 6,563,805 B1 | * | 5/2003 | Ma et al. | 370/325 |
| 6,597,899 B2 | * | 7/2003 | Souetinov et al. | 455/323 |
| 6,735,456 B2 | * | 5/2004 | Cathey et al. | 455/574 |
| 6,871,048 B2 | * | 3/2005 | Takagaki | 455/66.1 |

FOREIGN PATENT DOCUMENTS

EP 0 463 621 A 1/1992
WO WO 01/39406 A 5/2001

* cited by examiner

*Primary Examiner*—Blane J Jackson
(74) *Attorney, Agent, or Firm*—Merchant & Gould

(57) ABSTRACT

An apparatus and method is related to wireless communication devices with a reduced-noise recording receiver. The recording receiver receives a transmitted signal, converts the received signal to a digital base-band signal and stores the digitized base-band signal in a buffer for subsequent processing. The stored digital signals are subsequently processed to recover the transmitted data signal. The overall signal integrity in the receiver is improved by performing signal processing after reception is complete. The IF processing section of the receiver includes a frequency band translation section. The frequency band translation section translates the frequency band of the IF signal into a non-harmonically related frequency band. Since the IF signal is in an unrelated frequency band, data can be recovered from the transmission signal with improved signal-to-noise characteristics. At least a portion of the non-essential electronics are disabled during reception to avoid additional interference and sources of noise.

20 Claims, 10 Drawing Sheets

SYSTEM AND METHOD FOR REDUCING NOISE IN A RECORDING RECEIVER

CROSS REFERENCE TO RELATED APPLICATION

This patent application is a continuation of U.S. patent application Ser. No. 10/044,301, which was filed Oct. 26, 2001, and claims the benefit under 35 U.S.C. § 120 of the filing date.

FIELD OF THE INVENTION

The present invention relates generally to receiver systems. More particularly, the present invention relates to a reduced noise receiver system that is arranged to record the received information.

BACKGROUND

Analog or digital information may be communicated to a remote receiver using a variety of communication theory techniques. A typical transmission system includes a transmitter, a communication channel, and a receiver. The transmitter coverts the analog or digital information into a form that is suitable for transmission over the communication channel. The receiver recreates the original information from the transmitted signal. The communication channel may be any transmission medium such as wire, optical fiber, or merely free space in which the signals are transmitted as an electromagnetic wave (e.g., radio and television signals).

In a typical wireless communication system, a data signal that includes the information is modulated with a carrier signal and transmitted into free space with an antenna. The receiving system has an antenna and receiver that are tuned to the carrier frequency. The receiving system demodulates the received signal and extracts the data signal.

As the transmission signal propagates through the communication channel, noise and other non-ideal effects such as signal interference may degrade the transmission signal. The transmitter and receiver are carefully designed such that the data signal can be extracted from the transmission signal despite the introduction of noise and other non-ideal effects.

SUMMARY

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is directed at providing a system and method for reducing noise in a receiver system.

Described below are exemplary system and methods that are directed to a receiver system that includes an intermediate frequency (IF) processing section, and a frequency band translation section. The IF processing section translates the received transmission signal to an IF band signal that is subsequently coupled to the frequency band translation section. The frequency band translation section is arranged to translate the frequency band of the IF signal into a non-harmonically related frequency band. By translating the frequency band of the IF signal to an unrelated frequency band, data can be recovered from the transmission signal with improved signal-to-noise characteristics.

Also described below is an exemplary system and method directed to a receiver system that includes a receiver, an analog-to-digital converter, and a memory store. A transmission signal is received by the receiver and translated down to a base-band frequency. The base-band signal is converted from an analog signal to a digital signal by the analog-to-digital converter. The digital signal is stored in the memory store. The stored digital signal may then be subsequently processed to recover the transmitted data signal. The overall signal integrity in the receiver is improved by recording the digital signal and subsequently recovering the information from the recorded digital signal.

An illustrative method that is directed to a receiver system with improved reception by reducing the non-ideal effects on reception due to digital electronics is also described. The receiver system includes a frequency synthesizer that is utilized to tune the operating frequencies in the receiver section. At least a portion of the non-essential parts of the frequency synthesizer is disabled such that the overall system noise levels are reduced.

An apparatus and method for a wireless communication device that receives a transmitted signal, and converts the received signal to a digital base-band signal that is stored in a buffer for subsequent processing is also described below. The stored digital signals are subsequently processed to recover the transmitted data signal. The overall signal integrity in the receiver is improved by performing signal processing after reception is complete. The IF processing section of the receiver includes a frequency band translation section. The frequency band translation section translates the frequency band of the IF signal into a non-harmonically related frequency band. Since the IF signal is in an unrelated frequency band, data can be recovered from the transmission signal with improved signal-to-noise characteristics. At least a portion of the non-essential electronics are disabled during reception to avoid additional interference and sources of noise.

In an embodiment described below a wireless apparatus includes an antenna that produces an RF signal in response to an FM signal that is in a particular frequency band. The RF amplifier is coupled to the antenna and produces an amplified RF signal in response to the RF signal. An IF signal processor is coupled to the RF amplifier and produces an IF signal in response to the amplified RF signal. A base-band signal processor is coupled to the IF signal processor and produces a base-band signal in response to the IF signal. A post detector processor is coupled to the base-band signal processor and produces two digital signals in response to the base-band signal, the two digital signals corresponding to a digitized I and Q base-band signal. A buffer is coupled to the post detector processor and stores the digitized I and Q base-band signals when active, wherein the digitized I and Q base-band signals are stored in the buffer for post processing such that signal processing may be performed on the stored digitized I and Q base-band signals at a subsequent time after an entire transmission has been received.

In another embodiment described below the apparatus for wireless communication is a watch having a watchband. The apparatus includes an antenna that produces an RF signal in response to a FM signal that is in a particular frequency band, wherein the antenna is formed in the watchband. An RF amplifier is coupled to the antenna and produces an amplified RF signal in response to the RF signal. An IF signal processor is coupled to the RF amplifier and produces an IF signal in response to the amplified RF signal. A base-band signal processor is coupled to the IF signal processor and produces a base-band signal in response to the IF signal. A post detector processor is coupled to the base-band signal processor and produces two digital signals in response to the base-band signal, the two digital signals corresponding to a digitized I and Q base-band signal. A buffer is coupled to the post detector processor and stores the digitized I and Q base-band signals when active, wherein the digitized I and Q base-band signals are stored in the buffer for post processing such that signal processing may be performed on the stored digitized I and Q base-band signals at a subsequent time after an entire transmission has been received.

A method directed to recording data from a wireless communication transmission is also described. That method may include: issuing a shut-down alert, tuning the receiver to a desired frequency, disabling non-essential electronics after the shut-down alert and the receiver tuning has settled, starting a capture sequence for the receiver, receiving the wireless communication transmission with the receiver and producing a base-band signal, digitizing the base-band signal from a captured transmission, storing the digitized base-band signal in a buffer, stopping the capture sequence for the receiver at the expiration of a predetermined time interval, and enabling non-essential electronics after the expiration of the predetermined time interval.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

The present invention generally relates to a reduced noise receiver system that is arranged to record received information. A recording receiver is arranged to record data that is received from a transmission such that the recorded data can be subsequently processed. The recorded data may be processed, e.g., by a digital signal processor (DSP), a microprocessor, or micro-controller system. By "offloading" the signal processing to a post-processing function (e.g., after reception of all recorded data is complete), the overall system noise is minimized. Refer to FIGS. 3, 7-9, and the discussions related thereto for additional details on the operation of the recording receiver.

Figure 5:
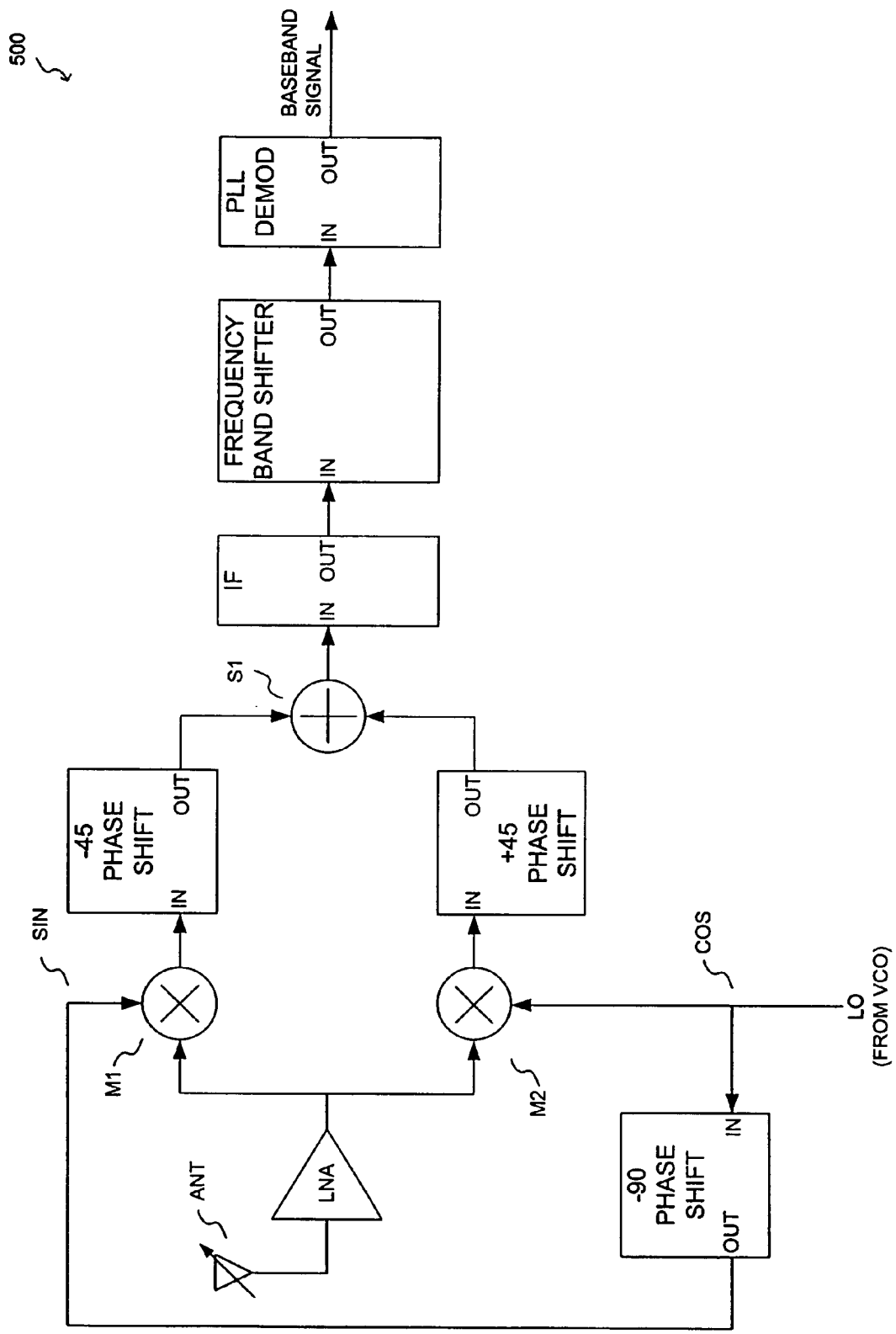
FIG. 5 is a schematic diagram illustrating a portion of an exemplary wireless apparatus.
Figure 6:
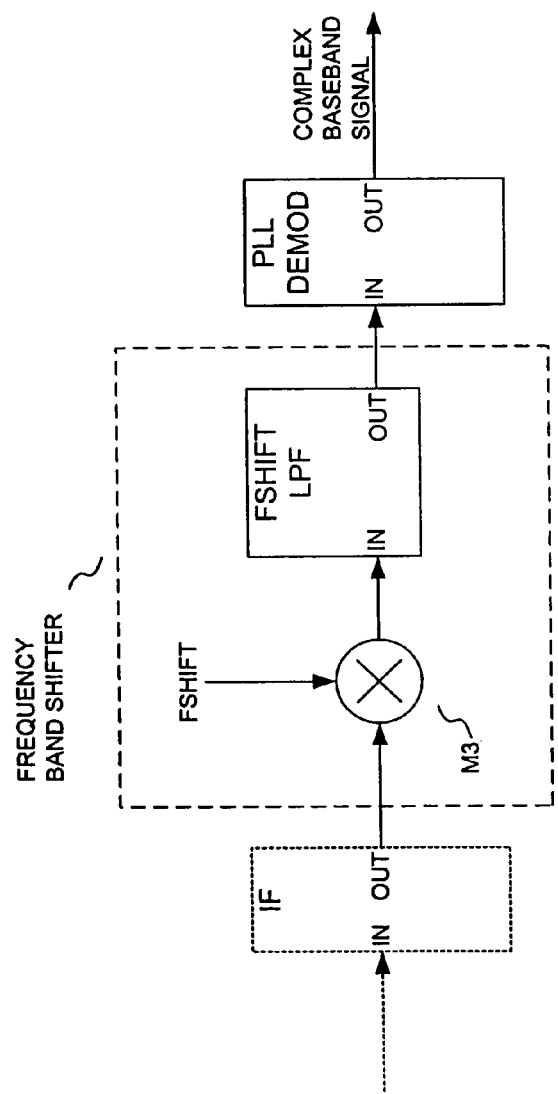
FIG. 6 is a schematic diagram illustrating a portion of an exemplary wireless apparatus including a frequency band shifter.

The present invention also relates to a reduced noise receiver system that includes a shifted IF frequency band processor in the receiver. By shifting the frequency band of the IF signal to a non-harmonically related frequency band, data can be recovered from the transmission signal with improved signal-to-noise characteristics. Refer to FIGS. 5-6 and the discussion related thereto for further details.

Figure 4:
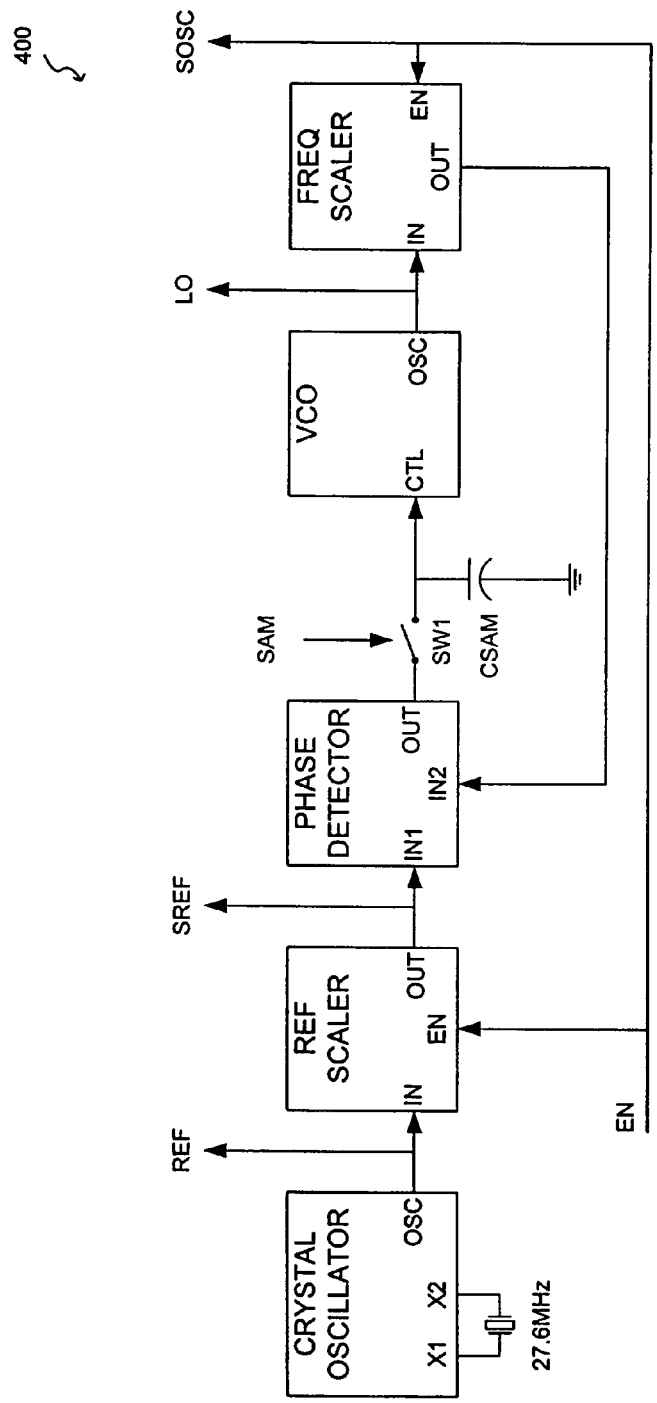
FIG. 4 is a block diagram illustrating an exemplary time-base for use in an exemplary wireless apparatus.
Figure 9:
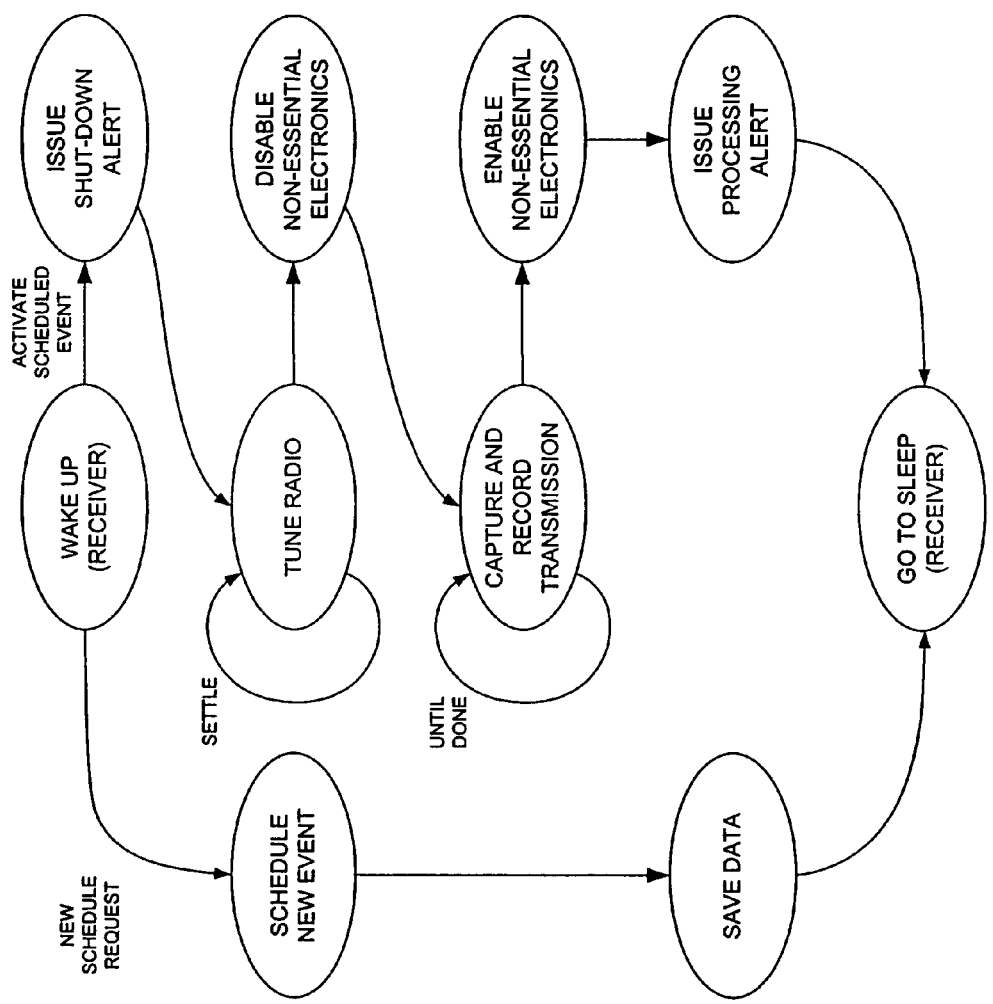
FIG. 9 is a processing flow diagram illustrating the operation of an exemplary recording receiver used in an exemplary wireless apparatus.

The present invention also relates to a reduced noise receiver system that includes a facility to disable non-essential electronics during the operation of the receiver. By disabling the non-essential electronics during the operation of the receiver, noise effects from the non-essential electronics are minimized and receiver reception is improved. Refer to FIGS. 4 and 9 and the related discussion for further details.

The overall operating environment for the reduced noise receiver system will be discussed as follows below with reference to FIGS. 1 and 2.

Operating Environment

Figure 1:
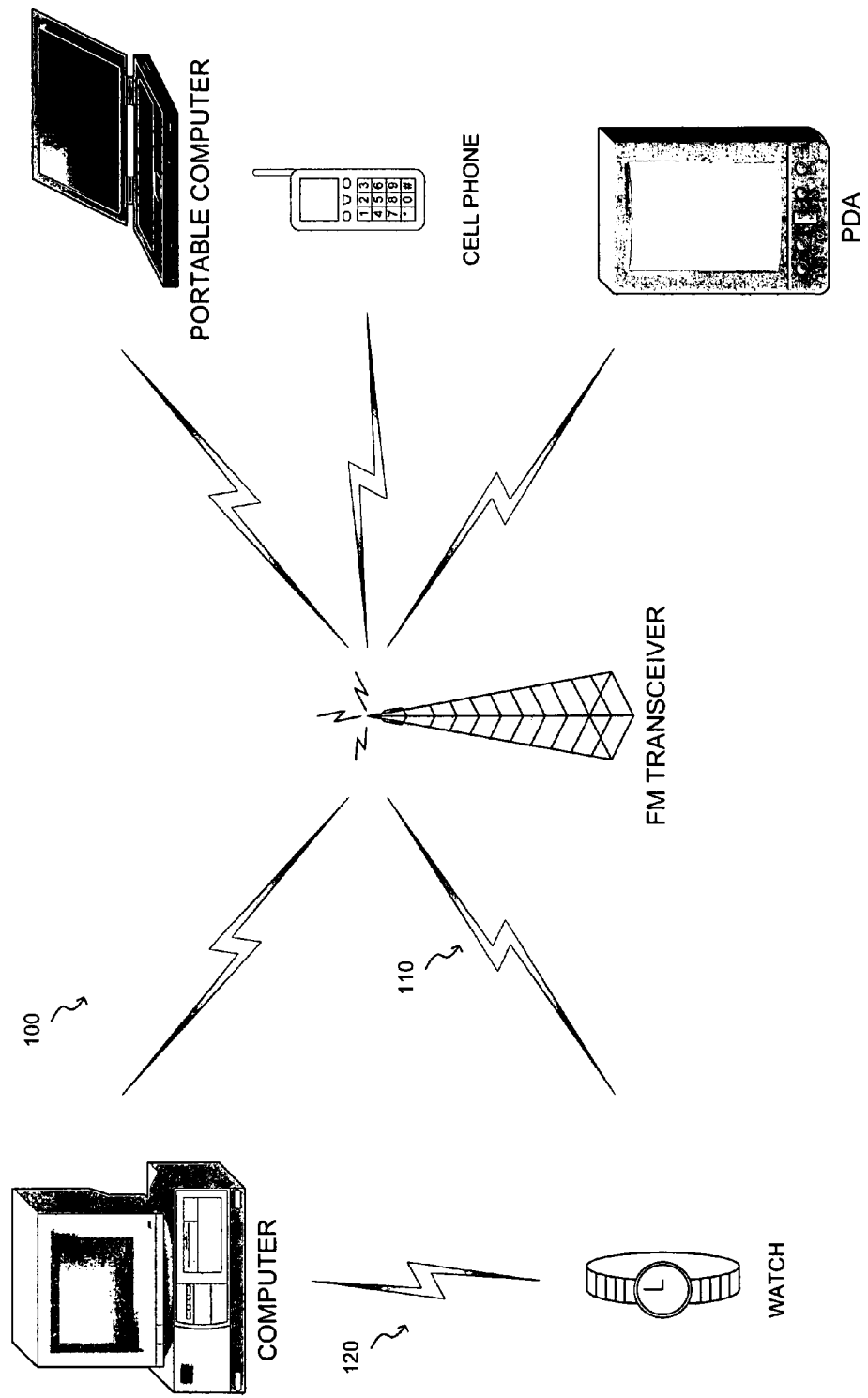
FIG. 1 illustrates an operating environment.

FIG. 1 illustrates an exemplary operating environment (100) for the present invention. As illustrated in the figure, an FM transceiver or broadcast is transmitted over a communication channel (110) to various electronic devices. Example electronic devices that have an FM receiver or transceiver may include a desktop computer, a watch, a portable computer, a wireless cellular telephone (cell phone), and a personal data assistant (PDA). The electronic devices are arranged to receive information from the FM broadcast. The FM broadcast may be of any number of types including but not limited to: a standard FM transmission, a sub-carrier FM transmission, or any other type of FM transmission as may be desired.

FM sub-carriers are often referred to as an SCA as identified by the Federal Communications Committee (FCC) term for the Subsidiary Communications Authorization. An FM sub-carrier utilizes bandwidth that is otherwise unused in the FM stereo-band about an FM station. In the United States of America the FCC requires the modulation bandwidth to be roughly from 53 KHz to 100 KHz within the modulation bandwidth of the FM station.

The electronic devices may also include facilities to communicate with other electronic devices over an alternative communication channel (120) in another operating mode. In this case, the electronic devices operate as local broadcast ("local cast") transceivers that receive and transmit over a limited distance. In the local cast mode data may be communicated among electronic devices over the alternative communication channel (120) using a direct frequency shift keyed (FSK) modulation, or any other type of modulation method that is adequate for a local short range transceiver operation.

Figure 2:
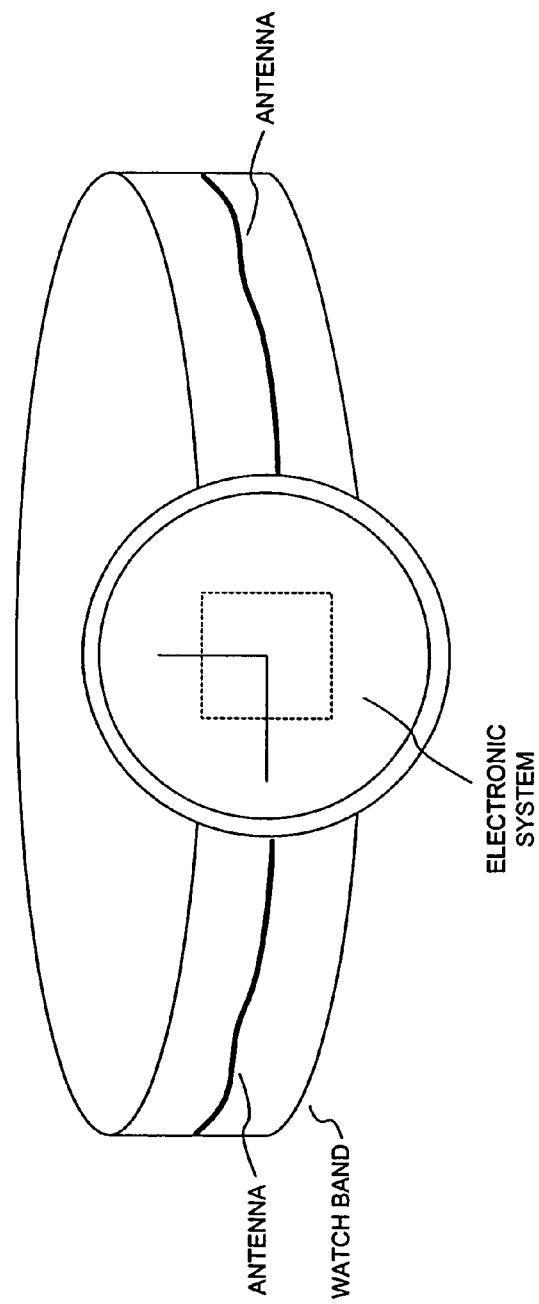
FIG. 2 illustrates an exemplary wireless apparatus.

FIG. 2 illustrates an exemplary watch device (200) that includes an electronic system that is arranged to operate as either a receiver or transceiver type of device. As illustrated in the figure, the watch-band includes an antenna that is either attached to the watch band or integrally formed within the watch band. The antenna is coupled to the electronic system that is contained in the watch. The electronic system may be contained in the bezel as shown in FIG. 2, or in some other portion of the watch device (not shown).

Figure 3:
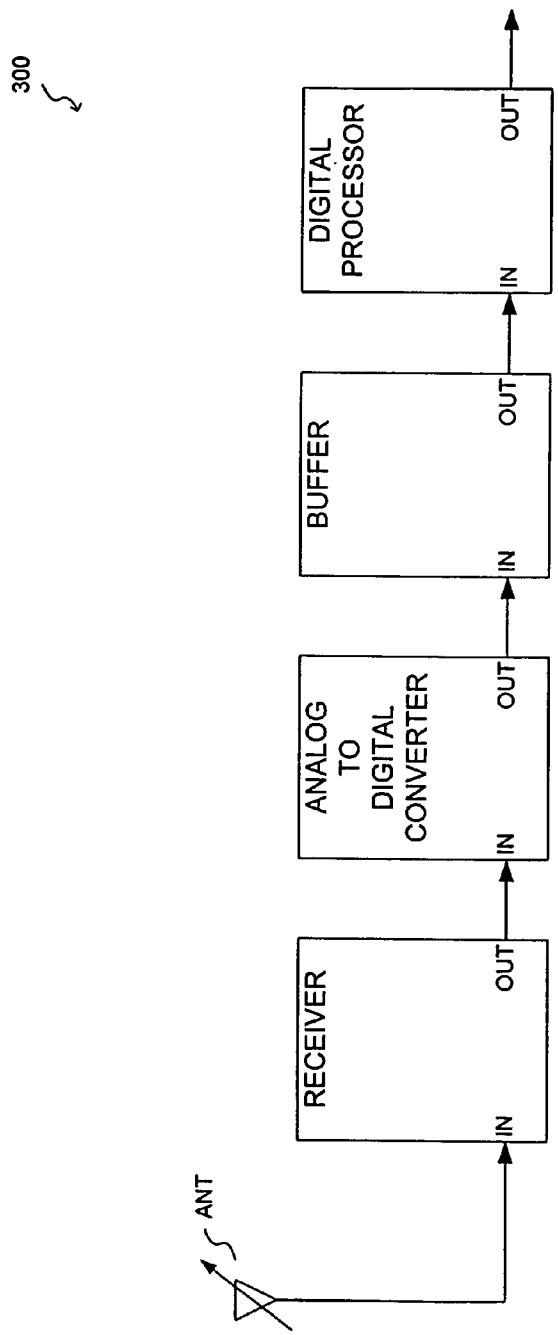
FIG. 3 is a block diagram of an exemplary wireless apparatus.

The operation of the reduced noise recording receiver system will be discussed as follows below. FIG. 3 is an exemplary system level diagram, while FIGS. 4-7 illustrate additional details for an exemplary system.

System Operation

FIG. 3 illustrates an overview of an illustrative recording receiver system (300). The recording receiver system (300) includes an antenna, a receiver, an analog-to-digital converter (ADC), and a buffer. The antenna is coupled to the input of the receiver. The output of the receiver is coupled to the input of the ADC. The output of the ADC is coupled to the input of the buffer. The output of the buffer may be coupled to a digital processor.

In operation, information is modulated on a carrier signal and transmitted into free space (not shown). The antenna in the recording receiver system (300) is tuned to the carrier signal and produces a received signal. The receiver demodulates the received signal and produces a base-band signal. The ADC converts the base-band signal into digital data that is stored in the buffer. After a complete transmission sequence is received, the digital data may be later reassembled into the information by a digital signal processor such as a microprocessor, micro-controller, or other digital signal processing (DSP) based electronic system. Additional control circuits and procedures (not shown) are utilized to control the receiver system as will be discussed in subsequent discussions below.

A single transmitted message may consist of multiple individual transmission segments, where each transmission segment is only a portion of the message. The transmission segments may include error correction encoding and other timing information so that the original message may subsequently be reconstructed. Also, the transmitted message may be interleaved such that the transmitted segments are out of order for security and/or error correction reasons. The buffer is utilized to record all of the transmitted segments. Since the transmitted segments are recorded, the message does not need to be processed in real time. A digital processor (e.g. a microprocessor, controller, digital control logic, DSP processor) can process the recorded segments at a later time. The digital processor can then perform multiple functions on the captured data, including but not limited to, timing recovery, sub-carrier phase recovery, baud recovery and/or tracking, compensation for signal fading, demodulation, de-interleaving, channel state estimation, and error correction.

FIG. 4 illustrates an exemplary time-base circuit (400) that may be utilized in the present invention. The time base circuit (400) includes a crystal oscillator, a reference scaler (REF SCALER), a phase detector, a controlled switch (SW1), a capacitor (CSAM), a voltage controlled oscillator (VCO), and a frequency scaler (FREQ SCALER).

An output of the crystal oscillator is coupled to the input of the reference scaler. The output of the reference scaler is coupled to the input of the phase detector. The output of the frequency scaler is coupled to another input of the phase detector. The output of the phase detector is coupled to one side of the controlled switch. The capacitor is coupled to another side of the controlled switch and a control input (CTL) of the VCO. The OSC output of the VCO is coupled to the input of the frequency scaler. The reference scaler, and frequency scaler include an enable terminal (EN) that is coupled to a control signal (EN). The controlled switch includes a control terminal that is coupled to another control signal (SAM).

In operation, the time-base circuit (400) has two operating modes. The first operating mode is a closed loop mode where the reference scaler and the frequency scaler are enabled, and the controlled switch is closed. The second operating mode is an open loop mode where the controlled switch is open, and the reference scaler and frequency scaler are disabled.

In the first operating mode the time-base circuit (400) functions as a phase-locked loop. The crystal oscillator produces a reference signal (REF) that is scaled up or down in frequency by the reference scaler. The VCO produces an oscillation signal (OSC) that is scaled up or down in frequency by the frequency scaler. The phase detector compares the scaled reference signal (SREF) to the scaled oscillator signal (SOSC). The output of the phase detector corresponds to the difference between the SREF and SOSC signals. The capacitor (CSAM) will operate as an integrator that stores a voltage. When steady state operation is achieved, the phase of SREF and SOSC will be close to one another and the phase detector output will stabilize at a relatively constant voltage. In the example illustrated in FIG. 4, the crystal oscillator operates at a frequency of 27.6 MHz.

In the second operating mode, the time-base circuit (400) is partially disabled but the VCO continues to operate. The controlled switch is opened when the phase-locked loop operation has stabilized at steady-state operation. As stated previously, the capacitor stores a voltage that corresponds to the output of the phase-detector. The VCO has a very high input impedance such that the capacitor will not discharge substantially between the second operating mode and the first operating mode. Thus, the control voltage that is applied to the VCO remains relatively constant and the capacitor acts as a track and hold circuit. Other circuit arrangements may be employed in place of the capacitor to achieve a similar track and hold type of function.

The output of the oscillator is utilized as the local oscillator (LO) for the receiver illustrated in FIG. 3. The digital processor illustrated in FIG. 3 utilizes the output of the crystal oscillator as a clock signal. As stated previously with respect to FIG. 3, the digital data is only processed after a complete transmission is stored in the buffer (i.e., "recorded"). Thus, the clock signals utilized for signal processing do not need to operate while the receiver is still receiving data from a particular transmission. By "recording" data during a receive mode and "processing" the data subsequently (e.g., a processing mode), the clock signals used in the signal processor can be disabled such that the overall noise level in the receiver during the critical reception time period can be greatly reduced.

FIG. 5 illustrates a portion of an illustrative receiver system (400). This portion of the receiver system (400) includes an antenna (ANT), a low noise amplifier (LNA), a first mixer (M1), a second mixer (M2), a −90 degree phase shifter, a −45 degree phase shifter, a +45 degree phase shifter, a summer (S1), an IF processor (IF), a frequency band shifter, and a phase-locked loop demodulator (PLL DEMOD).

The local oscillator (LO) from the VCO shown in FIG. 4 is coupled to a first input of the second mixer (M2) and an input of the −90 degree phase shifter. The output of the −90 degree phase shifter is coupled to a first input of the first mixer. The antenna is coupled to the input of the LNA. The output of the LNA is coupled to second inputs of the first and second mixers (M1, M2). The output of the first mixer (M1) is coupled to an input of the −45 degree phase shifter, while the output of the second mixer is coupled to an input of the +45 degree phase shifter. The outputs of the +/−45 degree phase shifters are coupled to the inputs of summer S1. The output of the summer is coupled to the input of the IF processor (IF). The output of the IF processor is coupled to the input of the frequency band shifter. The output of the frequency band shifter is coupled to an input of the PLL DEMOD.

In operation, the antenna and the local oscillator is tuned to an oscillator frequency that corresponds to a particular FM station. The LNA receives a small signal from the antenna and produces an RF signal. The RF signal is down-converted using an image-rejection mixer that is formed by mixers M1, M2, the +/−45 degree phase shifters, and summer S1. The summer produces a signal that is in an IF signal. The IF processor is arranged to amplify and filter the IF signal, and produce a second IF signal. The frequency band shifter is arranged to produce a band-shifted IF signal in response to the second IF signal. In one example, the IF processing is arranged to produce an IF signal that has a nominal frequency of 10.7 MHz, and the second IF signal is shifted down to a band of nominally 3.1 MHz. The PLL demodulator converts the band-shifted IF signal to a base-band signal.

FIG. 6 illustrates a detailed view of an exemplary frequency band shifter in a recording receiver system (600). The frequency band shifter includes a mixer (M3) and a frequency shift low pass filter (FSHIFT LPF). Mixer M3 includes an input that is coupled to the second IF signal and another input that is coupled to a frequency shift signal (FSHIFT). The frequency shift signal (FSHIFT) is derived from the VCO shown in FIG. 4.

In one example, FSHIFT is an oscillation signal that has a nominal frequency of 13.8 MHz and the second IF signal has a nominal frequency of 10.7 MHz. In this example, the output of mixer M3 will have a nominal frequency of 3.1 MHz (13.8 MHz-10.7 MHz) and FSHIFT LPF is an analog low pass filter with a −3 dB frequency of 3.1 MHz.

Since the second IF signal is translated to a relatively low frequency band by mixer M3 (e.g., 3.1 MHz), the analog low pass filter can be implemented "on-chip" using a gm-C filter topology. Also, since the PLL design has a nominal frequency of 3.1 MHz, the PLL demodulator can also be integrated "on-chip". The present invention achieves reduced cost in the FM receiver by translating the IF signal into a lower frequency range such that "on-chip" circuits may be employed. Also, the PLL demodulator, mixer M3, and the FSHIFT LPF operate at a frequency that is non-harmonically related to the data signal. Since the frequencies do not produce harmonics that will interfere with the reception, overall system noise is reduced and reception is improved.

Figure 7:
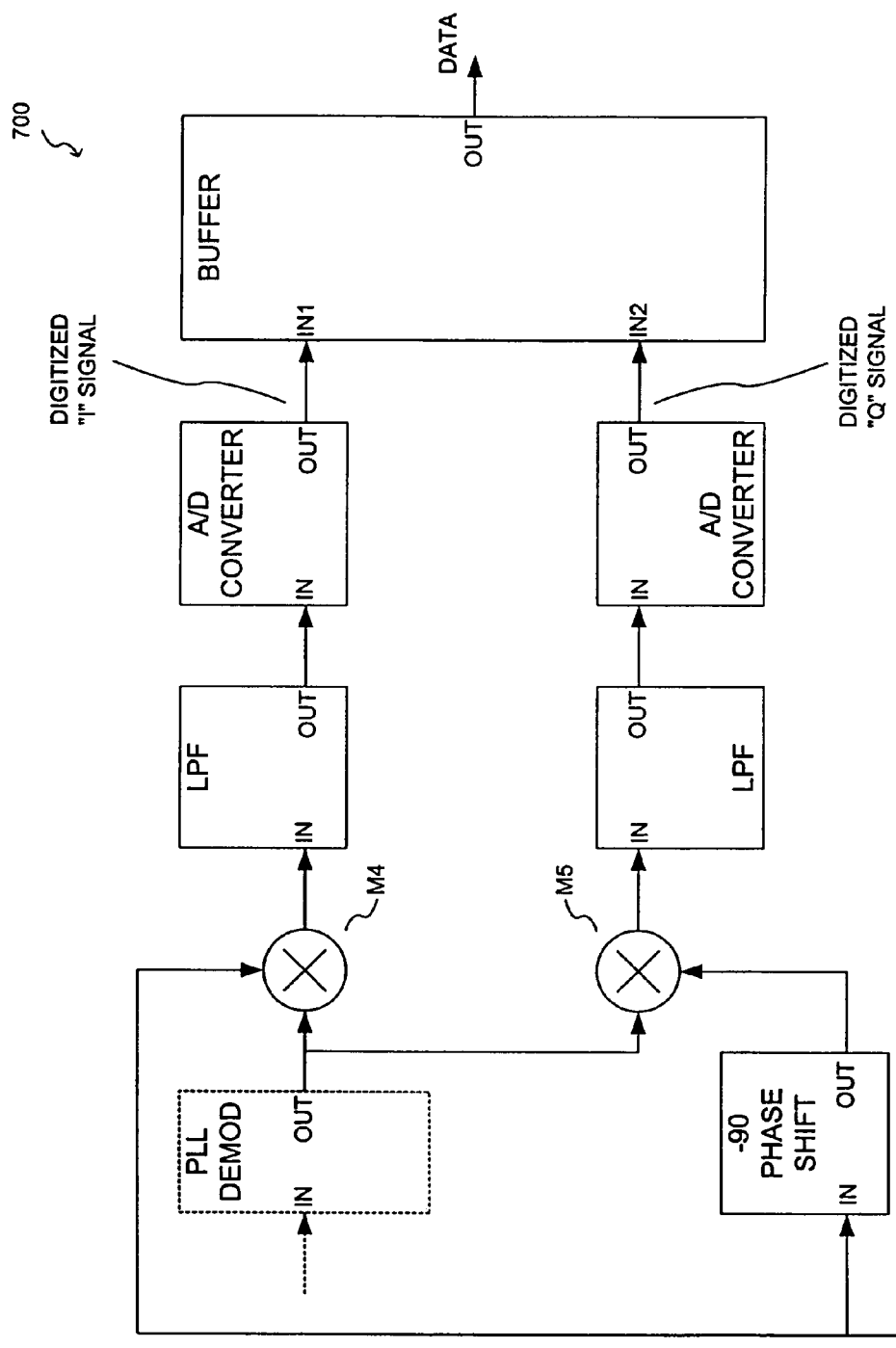
FIG. 7 is a schematic diagram illustrating a portion of an exemplary wireless apparatus including a base-band post processor and a buffer.

FIG. 7 illustrates a detailed view of an illustrative post detector processing (700) for the base-band signal produced by the PLL demodulator shown in FIG. 6. The post-detector processor includes two mixers (M4, M5), a −90 degree phase shifter, two low pass filters, two ADCs, and a buffer.

The −90 degree phase shifter has an input that is coupled to an oscillator signal (FSCA) and a first input of mixer M4, and an output that is coupled to the first input of mixer M5. The second inputs of mixers M4 and M5 are coupled to the output of the PLL demodulator. Mixer M4 has an output that is coupled to the input of one of the low pass filters, while mixer M5 has an output that is coupled to the input of the other low pass filter. The outputs of the low pass filters are coupled to the input of a respective one of the ADCs. The outputs of the ADCs are coupled to the inputs of the buffer.

Mixers M4 and M5, and their associated low pass filters (LPF), are arranged as part of a heterodyne system to recover the complex base-band signal. The complex base-band signal has a real and an imaginary portion that are 90 degrees out of phase with respect to one another. The real portion is often referred to as the "in-phase" or "I" portion, while the imaginary portion is often referred to as the "phase-quadrature" or "Q" portion. The I and Q portions of the complex base-band signal are digitized by their respective ADCs and stored in the buffer without any additional signal processing. Any signal processing that is necessary to recover the originally transmitted information can be accomplished in a non-real time or "off-line" manner after all of the transmitted information is received.

Figure 10:
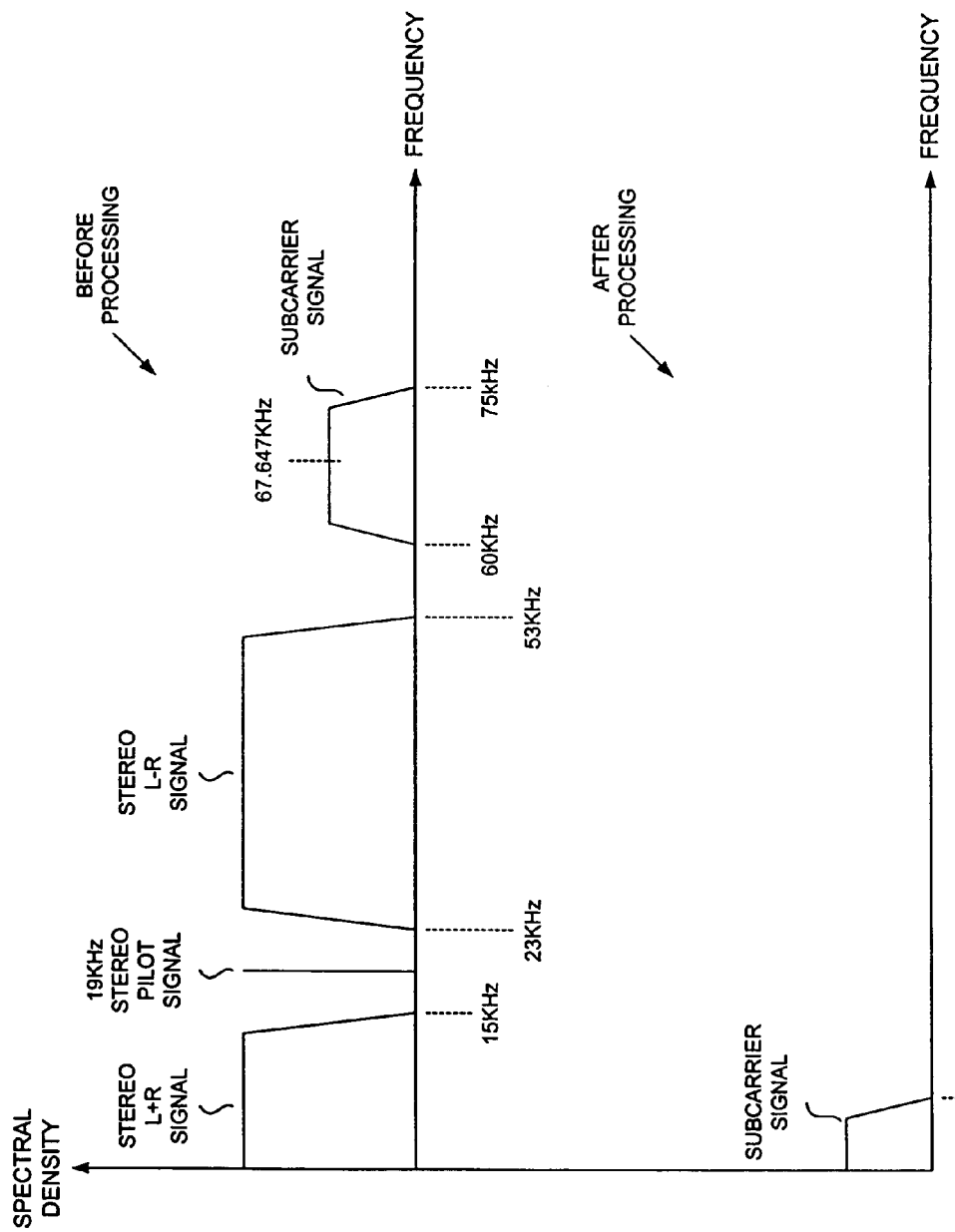
FIG. 10 is a diagram illustrating the spectrum for an FM signal including a sub-carrier before and after heterodyning the signals, in accordance with the present invention.

FIG. 10 illustrates an exemplary FM stereo spectrum for a complex base-band signal that includes an FM sub-carrier transmission. The complex base-band signal may be the output of the PLL demodulator as illustrated in FIGS. 6 and 7. As shown in FIG. 11, before the complex base-band signal is processed (BEFORE PROCESSING), the spectral characteristics of the FM transmission include: a stereo left+right (L+R) signal from 0-15 KHz, a stereo pilot signal at 19 KHz, a stereo left−right (L−R) signal from 23 KHz-53 KHz, and a sub-carrier signal from 60 KHz-75 KHz. The sub-carrier signal is roughly centered about 67.647 KHz. The sub-carrier signal can be recovered by passing the complex base-band signal through a band-pass filter with a high selectivity and a pass-band from 60 KHz-75 KHz.

Referring to FIGS. 7 and 10, the sub-carrier signal is recovered by translating the sub-carrier signal to a lower frequency and processing the complex signal with a low pass filter. Mixers M4 and M5 process the complex base-band signal by multiplying the complex base-band signal by an oscillation frequency of 67.647 KHz. The output of the mixer (either M4 or M5) has a spectral characteristic that include: a stereo L−R signal from 14.647 KHz-44.647 KHz, a stereo L+R signal from 52.647 KHz-67.647 KHz, and a sub-carrier signal from 0-7.357 KHz. This spectrum is passed through a low-pass filter (LPF) that is arranged to pass only the sub-carrier signal and block the other spectral components. An ADC digitizes the resulting signal from the output of the LPF. The signal path through mixer M4 corresponds to the in-phase or I signal, while the signal path through mixer M5 corresponds to the quadrature-phase or Q signal. Thus, digitized I and Q signals are created by the ADCs and stored in the buffer without any other processing.

As discussed with respect to FIGS. 3-7 above, the recording receiver system generally operates as a radio receiver that digitizes the received signal and stores the complex digital data in a buffer for subsequent processing by a signal processor. Since the recording receiver may be utilized in wireless devices as described with reference to FIGS. 1 and 2 above, overall power consumption and noise in the receiver are of paramount concern. To conserve power in portable devices, the radio receiver is powered off in a "sleep mode" and only "wakes up" when a receiver operation is necessary. As discussed previously above, non-essential electronics are powered off during the receiver operation in an effort to minimize noise and improve overall reception. Also, as discussed supra, the transmitted message may be transmitted as a sequence of interleaved message segments such that the scheduling of reassembly of the original transmitted message requires a controller mechanism.

A controller mechanism (i.e., a microprocessor, a wake-up timer, a control logic) is necessary to enable the receiver to automatically engage the "wake-up" and "sleep" modes. The controller can be selectively activated and deactivated using any number of means including a watchdog timer, an interrupt controller, or any other electronic wake-up circuit that is appropriately arranged. For example, a timer circuit can be used to periodically wake up the controller to see if there is anything to be processed. Also, an interrupt can be used to wake up the controller after the recording receiver has received a complete transmission. The overall processing flow of the recording receiver will be discussed as follows below.

Processing Flow

Figure 8:
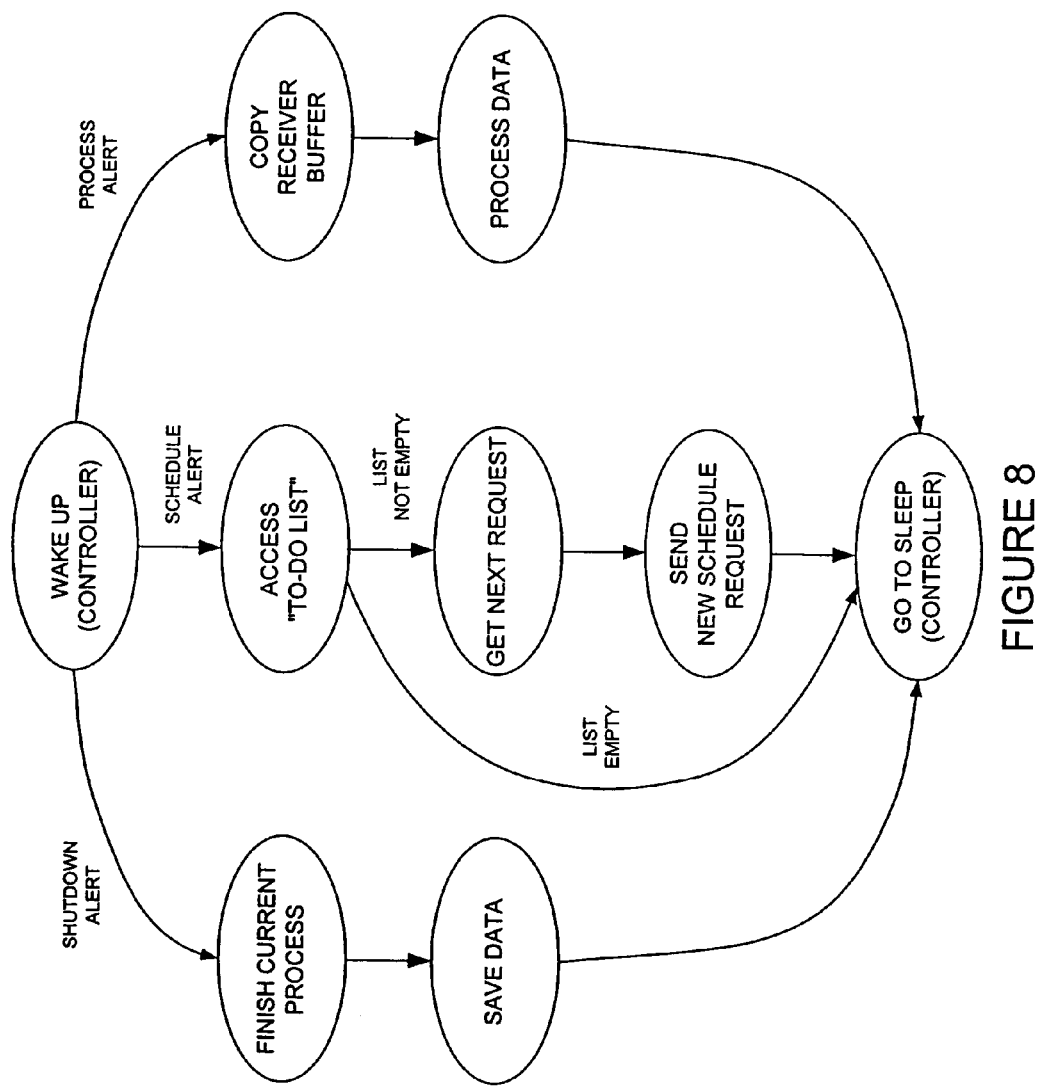
FIG. 8 is a processing flow diagram illustrating the operation of an exemplary controller used in an exemplary wireless apparatus.

FIG. 8 illustrates a process flow diagram for a controller that is arranged as discussed previously. Processing begins when the controller wakes up (active mode), and terminates when the controller goes to sleep (sleep mode).

The controller wakes up and enters an idle state in the active mode. From the idle state a number of events can occur that require attention. In the event that nothing requires attention upon wake up, the controller can either go back to sleep after some predetermined (or random) time-out period, or the controller can do housekeeping functions. Typical events that require attention may include a shutdown alert, processing alert, or a schedule alert.

After the controller receives a shutdown alert, the controller will either quickly finish the current process, or suspend the currently active process. In either case any data that is in use by the current process will be saved so that no information is lost. At some time after the data is saved, the controller goes to sleep (sleep mode). In the recording receiver system previously described, non-essential electronics are disabled when the receiver begins receiving data. The disabling of the controller can be accomplished by any means that is appropriate to suspend any processing of the controller such as, for example, disabling the clock signal that operates the controller. After the controller receives a schedule alert, the controller will access a memory (either internal or external) that includes a "to-do list". The "to-do list" is a list that contains a series of time driven events such as "check scheduled stock quotes at 3PM". When the "to-do list" is not empty, the next scheduled event is accessed from the "to-do list" and sent to the recording receiver as a new schedule request. After the schedule request is sent to the recording receiver, or if the "to-do list" was empty, the controller can either return to the idle state (active mode) or go to sleep (sleep mode).

The controller receives a processing alert when the recording receiver buffer has a complete transmission that requires attention. After the controller receives a processing alert, the controller will copy the digitized transmission (data) from the buffer into another memory area (either internal or external). The controller can than either process the data or issue a command to a signal processor (e.g., a digital signal processing unit) to begin processing the data. When the controller has completed processing (or activated the signal processor), the controller can either return to the idle state (active mode) or go to sleep (sleep mode).

The controller may include any number of other function modes (not shown). For example, when the controller is in a wireless watch device as illustrated in FIG. 2, the watch may have an alarm mode, a stopwatch mode, a display stored information mode, a data entry mode, a data transfer mode, a data synchronize mode, as well as other operating modes. These various modes can be used to set up other schedules that may be required by the user.

FIG. 9 illustrates a process flow diagram for a recording receiver (hereinafter simply referred to as a RECEIVER) that is arranged as discussed previously. Processing begins when the receiver wakes up (active mode), and terminates when the receiver goes to sleep (sleep mode).

The receiver wakes up and enters an idle state in the active mode. From the idle state a number of events can occur that require attention. In the event that nothing requires attention upon wake up, the receiver can either go back to sleep after some predetermined (or random) time-out period, or the receiver can do housekeeping functions. Typical events that require attention may include a new schedule request, or activating a scheduled event.

After the receiver gets a new schedule request, the receiver will access schedule a new event. The receiver includes a memory (either internal or external) that includes a "scheduled event list". The "scheduled event list" is a list that contains a series of time-driven events. Each time-driven event has a corresponding time and frequency that is stored in the event list, such as such as "FM channel 12, 3 PM.". This time event may correspond to the proper time and channel corresponding to a scheduled event from the controller such as, for example, "check scheduled stock quotes at 3 PM". When the new schedule request is processed as a new scheduled event and saved in the scheduled event list. After the new schedule request is saved, the receiver can either return to the idle state (active mode) or go to sleep (sleep mode).

In one embodiment, the receiver gets an activate scheduled event alert a nominal time interval before a previously scheduled events occurs. The previously scheduled event corresponds to the next event that is identified on the "scheduled event list". After the receiver receives the alert, the receiver issues a shutdown alert (aka power failure alert) to the other electronics in the system (e.g., the controller). The receiver then tunes the local oscillator and antenna in the receiver to the frequency that is identified in the "scheduled event list". Just prior to the designated event time, the receiver will disable the non-essential electronics in the overall system and subsequently begins to capture and record the transmitted information. The transmitted information is converted into a digital data stream that is stored in the buffer as previously described. After the designated time interval has expired, the non-essential electronics are enabled.

After at least a portion of the non-essential electronics are enabled, the receiver can either issue a processing alert to the controller (and/or signal processor), return to an idle state (active mode), or go to sleep (sleep mode). This depends largely on the type of transmission that is being received, and the specific implementation.

In one example, the transmitted information is transmitted in fixed length segments that are staggered over fixed time intervals beginning and ending at predetermined times (e.g., 16 segments make up one transmission). In this case, the receiver will not issue a processing alert until the last time interval has expired (e.g., the 16th segment has been received). After the last time interval has expired, the receiver will have captured and stored all of the segments (e.g., 16) that correspond the transmitted information. The receiver will wait until the last time interval has expired to ensure that all of the information has been received before processing is started.

In another example, the transmitted information is transmitted in a contiguous block over a fixed time interval beginning and ending at predetermined times. In this case, the receiver will issue a processing alert as soon as the ending time interval has expired. After the time interval has expired, the receiver will have captured and stored all of transmitted information.

The receiver includes a facility to ensure that the captured and recorded information overlaps in time with the actual transmission. For example, the receiver activates the capture and record mode just prior to the designated time, and deactivates the capture and record mode just after the designated expiration time (for a fixed segment size it is a fixed interval).

By activating the capture and record mode a time period before the actual transmission is enabled, the system is permitted to settle such that the beginning of the transmission sequence is not missed. Similarly, by deactivating the capture and record mode a time period after the transmission should have ended, the system ensures no loss of the transmission sequence.

Although the preceding description describes various embodiments of the system, the invention is not limited to such embodiments, but rather covers all modifications, alternatives, and equivalents that fall within the spirit and scope of the invention.

I claim:

1. A method for recording data from a wireless communication transmission with a receiver in a device that includes a digital processor, the method comprising:
    disabling at least a portion of non-essential electronics including the digital processor when the receiver is in a receive mode;
    starting a capture sequence for the receiver in the receive mode;
    receiving the wireless communication transmission during the receive mode;
    identifying an received in-phase (I) signal and a received quadrature-phase (Q) signal from the received wireless communication transmission during the receive mode, wherein the received in-phase (I) signal and the received quadrature phase (Q) signal correspond to a complex base-band signal;
    digitizing the complex base-band signal from a captured transmission during the receive mode, wherein the digitized complex base-band signal comprises a digitized in-phase (I) signal and a digitized quadrature phase (Q) signal;
    storing the digitized complex base-band signal in a buffer without further processing;
    exiting the receive mode after the capture sequence is completed and after each digitized complex base-band signal is stored;
    re-enabling the previously disabled at least the portion of non-essential electronics including the digital processor after the receive mode is exited; and
    reassembling digital data from the wireless communication transmission using the previously stored digitized complex base-band signals with the digital processor when re-enabled after the receive mode is exited such that the effects of noise in the digitized complex base-band signal are minimized by disabling the at least the portion of non-essential electronics including the digital processor while the digitized complex base-band signal is received.

2. The method of claim 1, further comprising: adjusting a tuning frequency associated with the receiver when the non-essential electronics are enabled, and maintaining the tuning frequency of the receiver when the non-essential electronics are disabled.

3. The method of claim 1, further comprising: processing the stored digitized complex base-band signal with the digital processor to recover a wireless communication transmission when the receiver is disabled in a processing mode.

4. The method of claim 1, further comprising: filtering the received in-phase (I) signal and the received quadrature phase (Q) signal from the complex base-band signal prior to digitizing.

5. The method of claim 1, wherein digitizing the complex base-band signal comprises: enabling a first analog-to-digital converter that is arranged to provide the digitized in-phase (I) signal in response to the received in-phase (I) signal, and enabling a second analog-to-digital converter that is arranged to provide the digitized quadrature-phase (Q) signal in response to the received quadrature phase (Q) signal.

6. The method of claim 5, wherein storing the digitized complex base-band signal further comprises: storing the digitized in-phase (I) signal in a first buffer, and storing the digitized quadrature phase (Q) signal in a second buffer.

7. The method of claim 5, wherein storing the digitized complex base-band signal further comprises: storing the digitized in-phase (I) signal in the buffer at a first time, and storing the digitized quadrature phase (Q) signal in the buffer at a second time that is different from the first time.

8. The method of claim 1, wherein digitizing the complex base-band signal comprises: enabling an analog-to-digital converter that is arranged to provide; the digitized in-phase (I) signal in response to the received in-phase (I) signal at a first time, and the digitized quadrature-phase (Q) signal in response to the received quadrature phase (Q) signal at a second time that is different from the first time.

9. The method of claim 8, wherein storing the digitized complex base-band signal further comprises: storing the digitized in-phase (I) signal in a first buffer, and storing the digitized quadrature phase (Q) signal in a second buffer.

10. The method of claim 8, wherein storing the digitized complex base-band signal further comprises: storing the digitized in-phase (I) signal in the buffer at a first time, and storing the digitized quadrature phase (Q) signal in the buffer at a second time that is different from the first time.

11. A method for recording data from a wireless communication transmission with a receiver, the method comprising:
    disabling at least a portion of non-essential electronics when the receiver is in a receive mode;
    starting a capture sequence for the receiver in the receive mode;
    receiving the wireless communication transmission during the receive mode;
    identifying an received in-phase (I) signal and a received quadrature-phase (Q) signal from the received wireless communication transmission during the receive mode, wherein the received in-phase (I) signal and the received quadrature phase (Q) signal correspond to a complex base-band signal;
    digitizing the complex base-band signal from a captured transmission during the receive mode, wherein the digitized complex base-band signal comprises a digitized in-phase (I) signal and a digitized quadrature phase (Q) signal;
    storing the digitized complex base-band signal in a buffer without further processing such that the effects of noise in the digitized complex base-band signal are minimized by disabling the at least the portion of non-essential electronics while the digitized complex base-band signal is received; and
    scheduling the capture interval such that the capture sequence begins a small time interval prior to an expected start time of the received transmission such that the digitized complex base-band signal includes information from the small time interval prior to the expected start time of the received transmission.

12. An apparatus for wireless communication, comprising:
    an antenna circuit that produces an RF signal in response to a FM signal that is in a particular frequency band;
    an RF amplifier circuit is coupled to the antenna circuit and produces an amplified RF signal in response to the RF signal;

an IF signal processor circuit is coupled to the RF amplifier circuit and produces an IF signal in response to the amplified RF signal in a frequency range determined by a local oscillator;

a base-band signal processor circuit is coupled to the IF signal processor circuit and produces a base-band signal in response to the IF signal;

a post detector processor circuit is coupled to the base-band signal processor circuit and produces two digital signals in response to the base-band signal, the two digital signals corresponding to a digitized I and Q base-band signal;

a buffer circuit is coupled to the post detector processor circuit and stores the digitized I and Q base-band signals when active, wherein the digitized I and Q base-band signals are stored in the buffer for post processing such that signal processing may be performed on the stored digitized I and Q base-band signals at a subsequent time after an entire transmission has been received;

a digital processor that is arranged to reassemble digital data from the FM signal using the previously stored digitized I and Q base-band signals when the digital processor is enabled; and a control circuit that is arranged to: disable at least a first portion of non-essential electronics including the digital processor when the apparatus is in a receive mode, enable at least a second portion of non-essential electronics that are used for adjusting the frequency range determined by the local oscillator when the apparatus is in a non-receive mode; and enabling the digital processor for reassembling digital data in the non-receive mode after all of the I and Q base-band signals associated with a complete transmission are stored.

13. The apparatus of claim 12, wherein the IF signal processor circuit includes an image rejection mixer circuit.

14. The apparatus of claim 13, the image rejection mixer circuit further comprising: a first mixer circuit that multiplies a sine signal with the amplified RF signal to produce a first signal, a second mixer that multiplies a cosine signal with the amplified RF signal to produce a second signal, a first phase shifter produces a first shifted signal that corresponds to the first signal shifted by −45 degrees, a second phase shifter circuit produces a second shifted signal that corresponds to the second signal shifted by +45 degrees, and a summer circuit that produces an IF signal by adding the first shifted signal and the second shifted signal.

15. The apparatus of claim 12, wherein the buffer circuit includes a first buffer that is arranged to store the digitized I base-band signal, and a second buffer that is arranged to store the digitized Q base-band signal.

16. The apparatus of claim 12, wherein the buffer circuit is arranged: store the digitized I base-band signal at a first time, and store the digitized Q base-band signal at a second time that is different from the first time.

17. The apparatus of claim 12, wherein the control circuit is further arranged to wake a receiver section of the apparatus from a sleep mode prior to a scheduled event, and set the receiver section of the apparatus in a sleep mode after the scheduled event has expired.

18. The apparatus of claim 17, wherein the control circuit is further arranged to activate the post detector processor circuit and the buffer circuit at a scheduled time to begin a capture time interval such that the entire transmission is captured during the capture time interval.

19. An apparatus for wireless communication in a watch having a watch band, comprising:
an antenna that produces an RF signal in response to a FM signal that is in a particular frequency band, wherein the antenna is formed in the watch-band;

an RF amplifier is coupled to the antenna and produces an amplified RF signal in response to the RF signal;

an IF signal processor is coupled to the RF amplifier and produces an IF signal in response to the amplified RF signal that is in a frequency range determined by an oscillation frequency of a local oscillator;

a base-band signal processor is coupled to the IF signal processor and produces a base-band signal in response to the IF signal;

a post detector processor is coupled to the base-band signal processor and produces two digital signals in response to the base-band signal, the two digital signals corresponding to a digitized I and Q base-band signal;

a buffer is coupled to the post detector processor and stores the digitized I and Q base-band signals when active, wherein the digitized I and Q base-band signals are stored in the buffer for post processing such that signal processing may be performed on the stored digitized I and Q base-band signals at a subsequent time after an entire transmission has been received;

a digital processor that is arranged for re-assembling digital data captured from the FM signal via the digitized I and Q base-band signals stored in the buffer when the digital processor is enabled;

a means for selectively disabling non-essential portions of the apparatus including the digital processor when the apparatus is operated in a receive mode such that noise effects associated with the non-essential portions of the apparatus are mitigated;

a voltage controlled oscillator that is arranged to adjustably select the oscillation frequency for the local oscillator in a non-receive mode when the voltage controlled oscillator is operated in a phase-locked loop, and wherein the voltage controlled oscillator is arranged to maintain the oscillation frequency for the local oscillator when operated in an open-loop during the receive mode; and a means for selectively enabling non-essential portions of the apparatus including operating the voltage controlled oscillator in a phase-locked loop when the apparatus is operated in a non-receive mode, and operating the digital processor to reassemble digital data in the non-receive mode after all of the I and Q base-band signals associated with a complete transmission are stored.

20. An apparatus as in claim 19, wherein the buffer stores multiple segments that are associated with a single message from a transmission, wherein each segment is part of the single message from the transmission such that the single message from the transmission is reassembled by the digital processor subsequent to receipt of all of the segments.

* * * * *

UNITED STATES PATENT AND TRADEMARK OFFICE
CERTIFICATE OF CORRECTION

PATENT NO.        : 7,437,136 B2
APPLICATION NO.   : 11/215688
DATED             : October 14, 2008
INVENTOR(S)       : Lawrence J. Karr Page 1 of 1

It is certified that error appears in the above-identified patent and that said Letters Patent is hereby corrected as shown below:

In column 11, line 59, in Claim 3, delete "digita1" and insert -- digital --, therefor, In column 12, line 16, in Claim 8, delete "provide;" and insert -- provide: --, therefor.

Signed and Sealed this
Twenty-sixth Day of April, 2011

David J. Kappos
*Director of the United States Patent and Trademark Office*